United States Patent Office 3,527,953
Patented Sept. 8, 1970

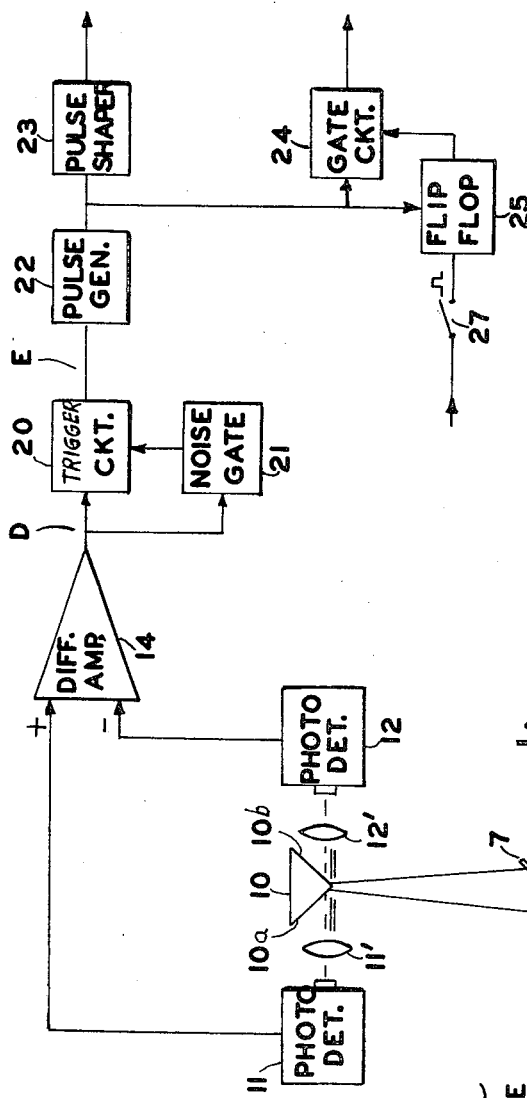
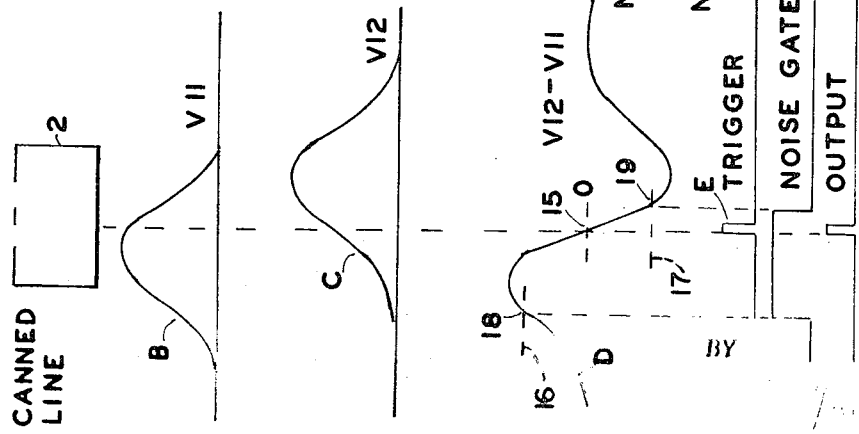
FIG 1
FIG 2
INVENTOR.
ANWAR K.
CHITAYAT

3,527,953
PHOTOELECTRIC LINE DETECTOR
Anwar K. Chitayat, Plainview, N.Y., assignor to OPTOmechanisms, Inc., Plainview, N.Y.
Filed Dec. 28, 1966, Ser. No. 605,362
Int. Cl. G01n 21/18
U.S. Cl. 250—219                    4 Claims

ABSTRACT OF THE DISCLOSURE

Photoelectric line detector means for accurately detecting the presence of a scanned line on a predetermined plane surface. A radiant energy beam is directed onto said surface. Means are provided to receive reflections of said beam of said line on said surface and then divide said beam reflections into first and second time spaced components. Means are provided to compare said components and generate a control signal.

---

Figure 3:
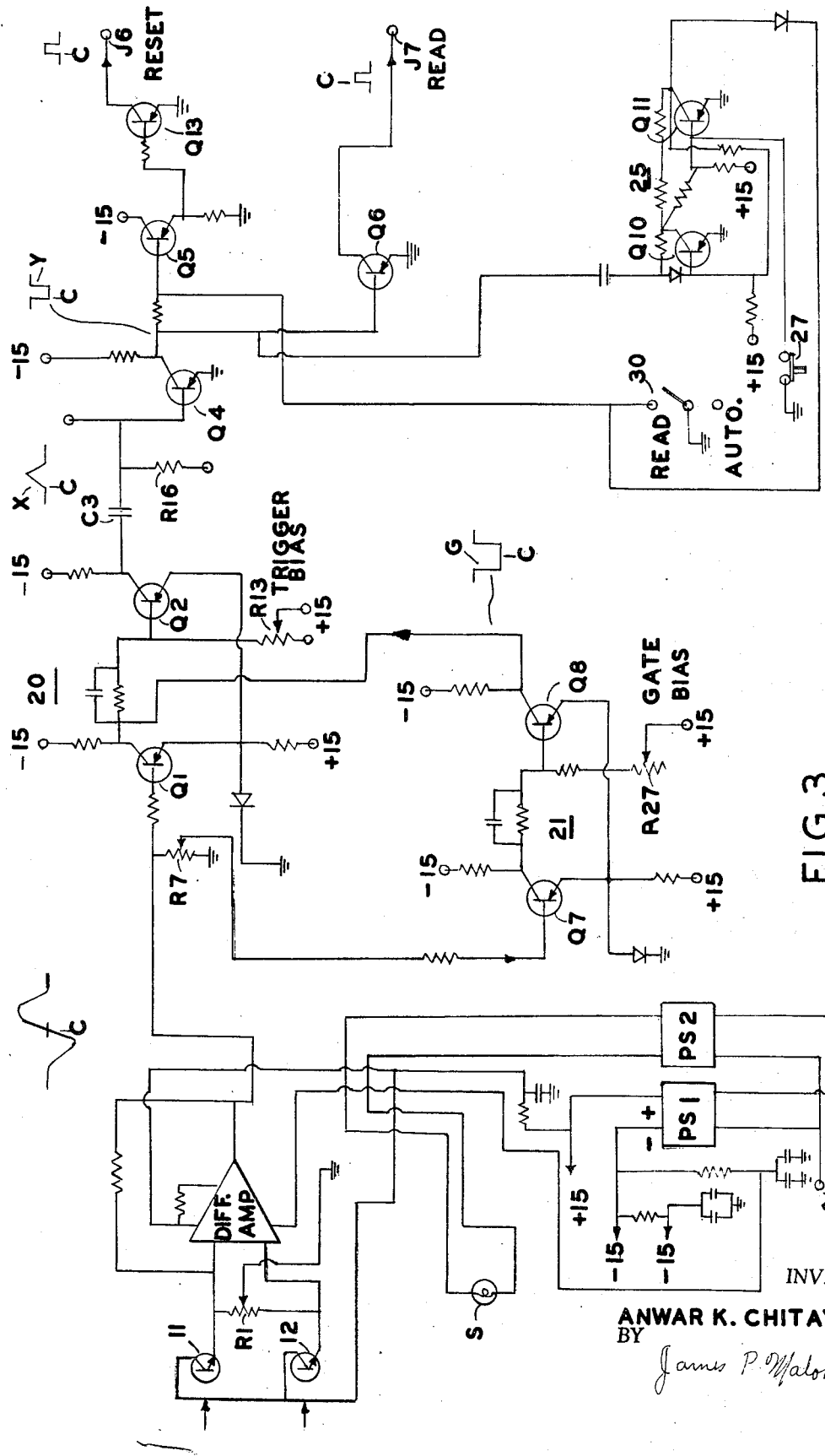

This invention relates to highly accurate photoelectric microscope means. More particularly the invention relates to highly accurate means to detect a scanned line including means to provide an accurate control pulse output.

An application of the present invention might be in precision machine tool apparatus wherein the scanned line is a line on a precision linear scale. The present invention will detect the line and generate a control pulse of high accuracy which could be used to trigger some operation or function of the machine tool. Another object of the present application will be in precision photorepeat cameras.

Accordingly the principal object of the invention is to provide new and improved photomicroscope means.

Another object of the invention is to provide new and improved means to detect a scanned line or other indicia.

Another object of the invention is to provide new and improved photoelectric means to detect a scanned line comprising means to detect reflections from said line, means to divide the reflections into two out of phase components and means to compare the components to generate a control pulse.

Another object of the invention is to provide new and improved photoelectric detector means having noise gate means.

Another object of the invention is to provide new and improved photoelectric detector means having reset pulse control means.

These and other objects of the invention will be apparent from the following specification and drawings of which:

FIG. 1 is a schematic block diagram.
FIG. 2 is a group of waveforms illustrating the operation of the invention, and
FIG. 3 is a schematic circuit diagram of the embodiment of FIG. 1.

Referring to FIG. 1 the present invention provides means to detect lines 1, 2, 3 having relative movement with respect to the objective lens 4. The lines may be marks on a highly accurate scale.

The purpose of the invention is to detect the line or other mark as accurately as possible. These means comprise the following:

A source of radiant energy 5 is focused by the lens 6 onto a beam splitter 7 which reflects the beam on to the objective lens 4 which focuses the beam on the plane 8 upon which the marks are located. As the line 2 moves past the axis of the objective lens a reflection will be received which is transmitted through beam splitter 7 and up to a prism reflector 10 which reflects the beam in two parts. One part is reflected off its surface 10a into a first photodetector 11. The prism 10 also reflects a beam off its other surface 10b into a second photo detector 12. Suitable lens means 11' and 12' are provided to focus the reflections into the photodetectors. The outputs of the photodetector are connected to a difference amplifier 14.

Referring also to FIG. 2 waveform B represents the output of the first photodetector 11 as the line 2 is scanned and waveform C represents the output of the second photodetector 12. Due to the relative motion and the dividing of the beam by the prism reflector 10 the photodetector outputs are spaced in time and phase as shown.

If these waveforms B and C are applied to the difference amplifier 14 the output will be the waveform D of FIG. 2 which has a very accurate cross zero crossover at point 15. The lines 16 and 17 represents the levels of activation of the noise gate circuit as will be discussed. Only signals received during the time from the points 18 to point 19 on the waveform D will be allowed to be transmitted by the noise gate.

The waveform D is connected to a pulse forming circuit 20 which may be a Schmitt trigger circuit which is adapted to generate a pulse at the zero crossover point 15 of waveform D.

The waveform D is also applied to a noise gate circuit 21 which generates a pulse gate during the time between point 18 and 19 on the waveform D. Undesired noise signals received at other times are thereby rejected.

The control pulse E at the output of the trigger circuit 20 is connected to an additional pulse generator circuit 22. The output of circuit 22 is preferably connected to a pulse shaping circuit 23 and also to a gate circuit 24 and a flip-flop circuit 25. The purpose of the circuits 24 and 25 is to provide reset control pulses.

The output of gate 24 is a reset pulse initiated by start cycle switch 27. Flip-flop circuit 25 normally blocks any output from gate circuit 24. An alternate light source 29 is preferably provided in case the scale 9 is transparent.

Referring to FIG. 3, in the waveforms in FIG. 3 the zero crossover is labeled C. Silicon detectors 11 and 12, receive quadrature signals V11 and V12 from the microscope beam splitter. These are fed to the operational amplifier 14. Potentiometer R1 is used as an equalizer for the detector output currents. The operational amplifier provides a differential signal at its output at approximately unity gain, as well as providing impedance transformation.

The signal is coupled to the input of Q1–Q2, which is a Schmitt trigger circuit 20 whose threshold is set at approximately zero volts. The signal is also coupled to Q–7 and Q–8, a similar noise rejection gate circuit 21 through the gate gain potentiometer R7. The logic is designed so that Q1 will not be enabled until the collector of Q8 swings negative providing gate G. This is done in order to discriminate against the zero level in the absence of signals. Some noise rejection is provided since the Q7–Q8 threshold is set at a higher value than that of Q1–Q2.

The output trigger is coupled to Q4 through a differentiating network C3 and R16. Transistor Q4 is biased to saturation and therefore, the positive going wave X from Q2 will turn Q4 off and produce a negative going pulse Y. The leading edge of this pulse should coincide with the zero crossing axis of the input signal. The setting of potentiometer R13, will affect this position, as will the setting of the zero adjust potentiometer R1. R27 in the enabling Schmitt circuit is adjusted in order to enable Q1 during the correct portion on the cycle.

The output of Q4 is coupled to stages Q5 and Q6. Q5 is connected to the Reset output jack, J6 through stage Q13.

Stages Q10 and Q11 form a flip-flop state 25. State Q11 will disable the reset pulse output when it is biased to saturation. This will allow only the "read" pulses to be generated.

The positive going edge of the wave at Q4 will turn Q10 off. This will saturate Q11 so as to prevent a reset pulse from being generated at the next sensing position.

Recycling pushbutton switch 27, when closed, permits a reset command pulse output on J6, which may be used to initiate some predetermined operation.

When switch 30 is in "read" position the reset control circuit 25 is grounded and only "read" pulses will appear.

The control circuits after the trigger is generated may be varied to suit any particular application.

Many modifications may be made by those who desire to practice the invention without departing from the scope thereof which is outlined by the following claims:

What is claimed is:

1. Photoelectric detector means for accurately detecting the presence of a line on a moving web on a predetermined plane surface comprising,
    a moving web with a line on it,
    a source of radiant energy beam,
    the means to direct said beam onto said web surface,
    means to receive first and second time spaced reflections of said beam caused by said moving line on said surface,
    means to divide said beam reflections into first and second time spaced components,
    first and second detector means, said first detector means being adapted to receive said first beam component and said second detector means being adapted to receive said second beam component,
    means connected to said detector means to compare said components, and trigger circuit means to detect the zero cross over of the combined first and second beam signals to generate a control signal.

2. Apparatus as in claim 1 wherein said time spaced components are in substantially quadrature phase relation.

3. Apparatus as in claim 1 wherein said beam directing means includes a beam splitter and objective lens means.

4. Apparatus as in claim 1 wherein said comparing means is a differential amplifier.

References Cited

UNITED STATES PATENTS

| | | | |
|---|---|---|---|
| 3,207,904 | 9/1965 | Heinz | 250—202 |
| 3,382,369 | 5/1968 | Räntsch et al. | |

ARCHIE R. BORCHELT, Primary Examiner

M. ABRAMSON, Assistant Examiner

U.S. Cl. X.R.

250—202, 237